(12) United States Patent
Johnson et al.

(10) Patent No.: US 10,146,835 B2
(45) Date of Patent: Dec. 4, 2018

(54) METHODS FOR STRATIFIED SAMPLING-BASED QUERY EXECUTION

(71) Applicant: Interana, Inc., Redwood City, CA (US)

(72) Inventors: Robert Johnson, Redwood City, CA (US); Boris Dimitrov, Redwood City, CA (US)

(73) Assignee: Interana, Inc., Redwood City, CA (US)

( * ) Notice: Subject to any disclaimer, the term of this patent is extended or adjusted under 35 U.S.C. 154(b) by 0 days.

(21) Appl. No.: 15/684,191

(22) Filed: Aug. 23, 2017

(65) Prior Publication Data

US 2018/0060398 A1    Mar. 1, 2018

Related U.S. Application Data

(60) Provisional application No. 62/378,604, filed on Aug. 23, 2016.

(51) Int. Cl.
*G06F 17/30* (2006.01)

(52) U.S. Cl.
CPC .. *G06F 17/30486* (2013.01); *G06F 17/30536* (2013.01); *G06F 17/30598* (2013.01)

(58) Field of Classification Search
CPC .............. G06F 17/30536; G06F 17/30584
See application file for complete search history.

(56) References Cited

U.S. PATENT DOCUMENTS

| | | | | |
|---|---|---|---|---|
| 5,335,345 | A * | 8/1994 | Frieder | G06F 17/30474 |
| 5,668,987 | A * | 9/1997 | Schneider | G06F 12/0802 |
| 5,893,090 | A | 4/1999 | Friedman et al. | |
| 6,775,681 | B1 * | 8/2004 | Ballamkonda | G06F 17/30454 707/718 |
| 8,768,870 | B1 * | 7/2014 | Corrado | G06N 99/005 706/12 |
| 8,868,580 | B2 * | 10/2014 | Gould | G06F 17/30466 707/758 |
| 2001/0032199 | A1 * | 10/2001 | Delo | G06F 8/61 |
| 2002/0178151 | A1 * | 11/2002 | Chaudhuri | G06F 17/30489 |
| 2003/0195872 | A1 | 10/2003 | Senn | |
| 2003/0212668 | A1 * | 11/2003 | Hinshaw | G06F 17/30545 |
| 2004/0225639 | A1 * | 11/2004 | Jakobsson | G06F 17/30463 |
| 2004/0243568 | A1 | 12/2004 | Wang et al. | |
| 2005/0065914 | A1 * | 3/2005 | Chang | G06F 17/30448 |
| 2005/0182762 | A1 * | 8/2005 | Srinivasan | G06F 17/30336 |
| 2005/0223019 | A1 | 10/2005 | Das et al. | |
| 2007/0294214 | A1 * | 12/2007 | Santosuosso | G06F 17/30477 |

(Continued)

FOREIGN PATENT DOCUMENTS

JP    10232804    9/1998
JP    10-26248    10/1998

(Continued)

*Primary Examiner* — William Spieler
(74) *Attorney, Agent, or Firm* — Jeffrey Schox; Thomas Gwinn

(57) ABSTRACT

A method for stratified-sampling-based query execution includes: receiving a query; collecting a first data sample from the first dataset using a non-stratified sampling technique; performing statistical analysis on the first data sample; identifying a stratum classifier from the statistical analysis; generating a stratum classification by calculating strata boundaries for the stratum classifier; and calculating a result to the query based on analysis of the second data sample.

3 Claims, 6 Drawing Sheets

(56) References Cited

U.S. PATENT DOCUMENTS

| | | | |
|---|---|---|---|
| 2012/0130997 A1 | 5/2012 | Risvik et al. | |
| 2013/0091170 A1 | 4/2013 | Zhang et al. | |
| 2013/0173597 A1 | 7/2013 | Do et al. | |
| 2014/0012814 A1* | 1/2014 | Bercovici | G06F 17/30578 707/636 |
| 2014/0108380 A1* | 4/2014 | Gotz | G06F 17/30994 707/722 |
| 2014/0108421 A1* | 4/2014 | Isaacson | G06F 17/3033 707/747 |
| 2014/0280287 A1* | 9/2014 | Ganti | G06F 17/30554 707/766 |
| 2015/0186493 A1* | 7/2015 | Balmin | G06F 17/30536 707/609 |
| 2017/0024452 A1* | 1/2017 | Budalakoti | G06F 17/30489 |

FOREIGN PATENT DOCUMENTS

| | | |
|---|---|---|
| JP | 2005-100392 | 4/2005 |
| JP | 2012-108635 | 6/2012 |
| JP | 2013-196565 | 9/2013 |
| WO | 2010018178 A1 | 2/2010 |
| WO | 2010148415 A1 | 12/2010 |
| WO | 2013016620 A2 | 1/2013 |
| WO | 2013033123 A2 | 3/2013 |

* cited by examiner

METHODS FOR STRATIFIED SAMPLING-BASED QUERY EXECUTION

CROSS-REFERENCE TO RELATED APPLICATIONS

This application claims the benefit of U.S. Provisional Application Ser. No. 62/378,604, filed on 23 Aug. 2016, which is incorporated in its entirety by this reference.

TECHNICAL FIELD

This invention relates generally to the data analytics field, and more specifically to new and useful methods for stratified sampling-based query execution in the data analytics field.

BACKGROUND

Businesses today collect huge amounts of data relating to sales, marketing, and other critical operations. Querying this data is often a difficult and resource intensive process, especially for many types of complex queries. To some extent, query performance can be improved by generating data aggregates and indices, but it is infeasible to do this across all dimensions in a large dataset. Because of this, query performance issues often slow data analysis. Efficient queries can be conducted by sampling techniques across large datasets, but these queries may suffer in performance when data fails to closely follow unimodal distributions. Thus, there is a need in the data analytics field to create methods for stratified sampling-based query execution. This invention provides such new and useful methods.

DESCRIPTION OF THE INVENTION EMBODIMENTS

The following description of the invention embodiments of the invention is not intended to limit the invention to these invention embodiments, but rather to enable any person skilled in the art to make and use this invention.

1. Method for Stratified-Sampling-Based Query Execution

Figure 1:
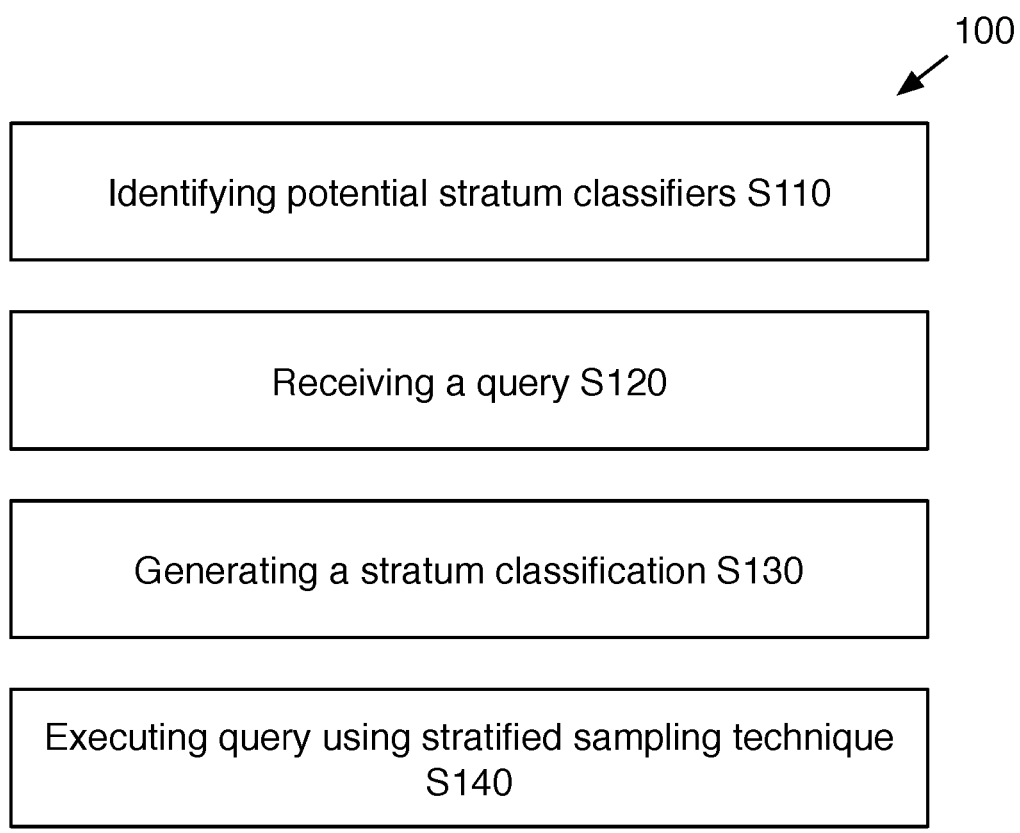
FIG. 1 is a chart view of a method of a preferred embodiment.

A method 100 for stratified sampling-based query execution includes identifying potential stratum classifiers S110, receiving a query S120, generating a stratum classification S130, and executing the query using a stratified sampling technique S140, as shown in FIG. 1.

Stratified sampling is a technique that involves splitting data into a set of collectively exhaustive and non-overlapping groups (i.e., strata) and sampling from each stratum independently (as opposed to from the data as a whole). This technique results in more representative sampling in scenarios where the variance of some data is generally smaller within strata than it is across the population (i.e., a collection of multiple strata). Stated more specifically, the variance associated with stratified sampling ($\sigma_s^2$) can be written as:

$$\sigma_s^2 = \sum_{h=1}^{L} \left(\frac{N_h}{N}\right)^2 \left(\frac{N_h - n_h}{N_h}\right) \frac{\sigma_h^2}{n_h}$$

where N is the population size, $N_h$ is the size of each stratum, $n_h$ is the number of observations in each stratum, L is the number of strata, and $\sigma_h$ is the sample standard deviation of stratum h. By selecting a stratum classification intelligently, a variance smaller than the variance obtained from a random sample of the population can be achieved (given the same total number of observations).

As confidence intervals for population parameters (e.g., population mean) are a function of variance, stratified sampling can lead to higher confidence that a population parameter is within a given range. Relatedly, stratified sampling can allow a given confidence (for a population parameter interval) to be reached with fewer samples than in random sampling of the population.

The method 100 functions to utilize stratified sampling to increase the performance of a sample-based data analysis system; for example, the system of U.S. patent application Ser. No. 14/644,081, the entirety of which is incorporated by this reference. Such a data analysis system functions by analyzing samples of a large dataset to estimate query results (instead of analyzing the entire dataset or relying on pre-calculated data aggregates or indexes). Sampling can be performed once or iteratively (using intermediate results to refine the sample used to evaluate the query).

Stratified sampling could reduce the number of samples required to generate a sufficiently representative response (i.e., a query result that is representative of a query result run on the population) and/or increase the accuracy of sampling; however, it is often extremely difficult to identify (for a given query) an appropriate stratum classification.

The method 100 therefore uses a number of techniques to identify potential stratum classifiers (S110); the identified potential classifiers (which in some cases may be identified prior to a query, and in other cases may be identified in response to a particular query) can be used to generate a stratum classification (S130). Then, a query (received in S120) can be evaluated using stratified sampling according to the generated stratum classification (S140).

S110 includes identifying potential stratum classifiers. S110 functions to identify fields in a dataset that may potentially make good stratum classifiers for other data (henceforth referred to as the target data) in the dataset.

S110 preferably includes identifying potential stratum classifiers by analyzing the distribution of the target data (or a sample of the target data) with respect to the stratum classifier. Preferably, potential stratum classifiers enable the target data to be split into strata, wherein the variance of the target data within each stratum is lower than the variance across the entire target data set. Alternatively, potential stratum classifiers may have some strata with higher variance than the overall variance (but the stratified sampling variance is still lower), or potential stratum classifiers may not necessarily enable lower variance at all, but instead may have an alternative purpose (e.g., to correct for a sample not representative of a particular population). Note that the term "stratified sampling variance" refers to the overall variance of a sample calculated using stratified sampling; e.g., $$\sigma_s^2 = \sum_{h=1}^{L} \left(\frac{N_h}{N}\right)^2 \left(\frac{N_h - n_h}{N_h}\right) \frac{\sigma_h^2}{n_h}$$

The target data is preferably data identified for sampling by the query received in S120. For queries interested in evaluating user behavior, the target data is preferably user behavior data (while, for user behavior data, potential stratum classifiers may be selected from user classifying data; e.g., data that describes a user's identity or demographics in some way, as opposed to the user's behavior).

The target data is a sample of one or more data fields of the dataset, but this sample is not necessarily a representative sample of the data field across the entire dataset. For example, an iterative sample-based query evaluating the number of weekly interactions users between the ages of 18-40 have with a website may first identify weekly interaction data correlating to users between the ages of 18-40 (e.g., if the data is sorted or otherwise grouped according to age) and then sample from this reduced dataset. Accordingly, a stratum classifier appropriate for all of the data in a field may not necessarily be appropriate for a subset of that data.

Further, execution of a complex query may be accomplished in a number of ways; for example, a query evaluating the number of weekly interactions male users between the ages of 18-40 have with a website may first involve identifying a subset of data corresponding to male users and then a subset of that data corresponding to users of the ages 18-40; alternatively, the query may involve identifying a subset of data corresponding to age and then a subset of that data corresponding to gender. Since this has an effect on how the target data is selected from the overall dataset, this in turn may affect choice of stratum classifier. For an iterative sample-based technique, the sampling mechanism and the number of iterations (or how iteration proceeds) may additionally have an effect on choice of stratum classifier for similar reasons.

Figure 2:
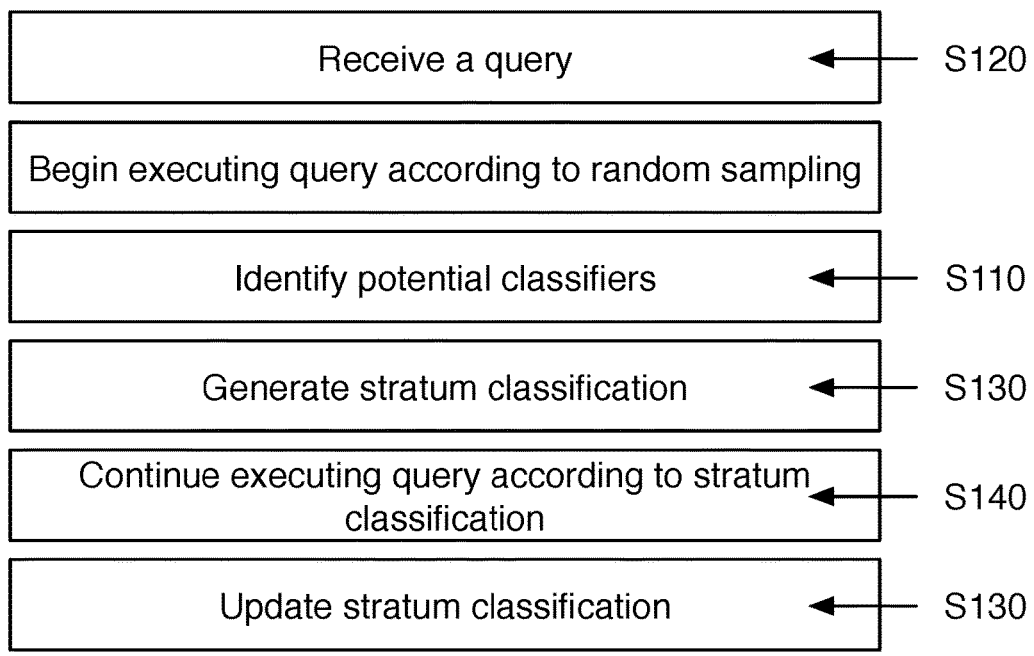
FIG. 2 is a chart view of an example implementation of a method of an invention embodiment.

The consequence of this is that in many cases it is difficult to identify a priori a stratum classifier for a given query. Resultantly, in many cases, S110 may not be performed until after beginning execution of a query (for example, a query received in S120 may begin execution according to a standard random sampling technique, but during execution, a potential stratum classifier may be identified by S110, a stratum classification may then be generated in S130 and the query may continue execution by stratified sampling in S140, as shown in FIG. 2). Nevertheless, there may be cases for which it is worthwhile to identify potential stratum classifiers prior to receiving the query in S120. The below examples are non-limiting and non-exhaustive examples of such cases.

In a first example, it may be generally known (or assumed) that a particular type of data (e.g., a type of user classifying data) may be a good stratum classifier for another type of data (e.g., a type of user behavior data) without actually evaluating the classifier on the queried dataset. Such a link between target data may be received in any manner (e.g., submitted as a potential classifier as part of the query, received from a user, stored in the query engine, etc.).

In a second example, it may be generally known that a particular type of data (e.g., a type of user classifying data) may have a large effect on many other types of data (e.g., types of user behavior data). For example, a dataset may be known to include anomalous data, such as a dataset that includes behavior for many normal users as well as a few 'whale' users (e.g., userIDs associated with a substantially larger amount of activity than that associated with the other userIDs). These 'whale users' may actually represent a composite of many 'real' users (this may occur, for example, if userID is based on IP address and many users use the same external IP, or if data is missing, such that userID is null). Accordingly, it may be assumed (or verified) that the distribution of behavior data across the anomalous users may be substantially different than across the other users (or alternatively that a representative sampling of behavioral data should not overly sample anomalous user data). Thus, the particular type of classifying data (or other data) may be used as a potential classifier for many (or all) types of target data. In this example, S110 may include evaluating potential target data fields against the identified potential classifier to determine if the classifier is suitable for each of the data fields evaluated.

In a third example, it may be known that a particular query (or group of similar queries) is frequently executed or a particular type of target data is frequently sampled. For example, queries may frequently request a type of user activity data (e.g., clicks per session). In this example, S110 may include evaluating the distribution of this type of target data with respect to all (or a subset of) possible classifying fields to determine a set of potential stratum classifiers for this particular type of target data (or query type).

Potential stratum classifiers may additionally or alternatively be selected from classifiers used to organize (e.g., shard/order/index) data. Accordingly, S110 may include selecting stratum classifiers from a list of classifiers used to organize data.

As previously mentioned, a stratum classifier appropriate for all of the data associated with a field may not be appropriate for a sample of that data. Potential classifiers identified in S110 may additionally be evaluated for dependence on other data fields (preferably, if the parameters used to select the sample of a field during a query are independent of the stratum classifier, a stratum classifier appropriate for the entire field is also appropriate for the sample). This may result in identifying (e.g., via statistical analysis) and storing conditions for a stratum classifier (e.g., a particular stratum classifier may be appropriate for a given set of target data selected from the field using any of the following classifying parameters, the classifying parameters independent of the particular stratum classifier). For example, a stratum classifier of UserID may be appropriate for user behavioral data further constrained by any of the following: time of day, user gender, etc. (this assumes that UserID and time of day, gender, etc. are statistically independent). This may alternatively be stated in the negative (e.g., stratum classifier A may be used except when selecting data according to constraints involving fields T, U, and V). As another example, these constraints may themselves be conditional (e.g., stratum classifier B may be used except when data is selected according to constraints on field X AND those constraints represent less than 65% of the total range of field X; stratum classifier B may be used except when data is selected according to constraints on field Y AND those constraints exclude field Y values 20-25).

Identification of potential stratum classifiers during execution of a query may be performed similarly, although the space over which analysis is required may be reduced: instead of identifying a potential stratum classifier that works generally for a type of data and then attempting to determine if this classifier is appropriate for a sample of that data, S110 may include identifying a potential stratum classifier based on the target data sampled during execution of the query. Alternatively, S110 may include identifying a potential stratum classifier in any manner.

As the data sampled as part of query execution may change (based on query iteration and/or the specific execution order of the query), S110 may additionally include updating or otherwise modifying a set of potential stratum classifiers.

S110 may include identifying potential stratum classifiers in any manner; for example, by examining data distributions for evidence of multimodal distributions. S110 may additionally or alternatively include performing any suitable processing or statistical analysis on target data (and/or other data) in order to identify potential stratum classifiers.

For example, S110 may include receiving a list of stratum classifiers and calculating variances, standard deviations, means, and/or other statistics of target data across stratum classifier values or stratum classifier value ranges. If any of these statistics are significantly different across values/value ranges of a particular classifier, that may indicate that the stratum classifier is a good one (and S110 may include selecting this classifier to stratify data). S110 may additionally or alternatively include comparing the performance of stratum classifiers in this manner (e.g., if the variation in variances is higher across ranges of one classifier than another, the one may be a better classifier than the other) and selecting stratum classifiers based on the results of the comparison.

S120 includes receiving a query. S120 functions to receive a query for which stratified sampling may be performed during execution of the query (in S140).

Figure 3:
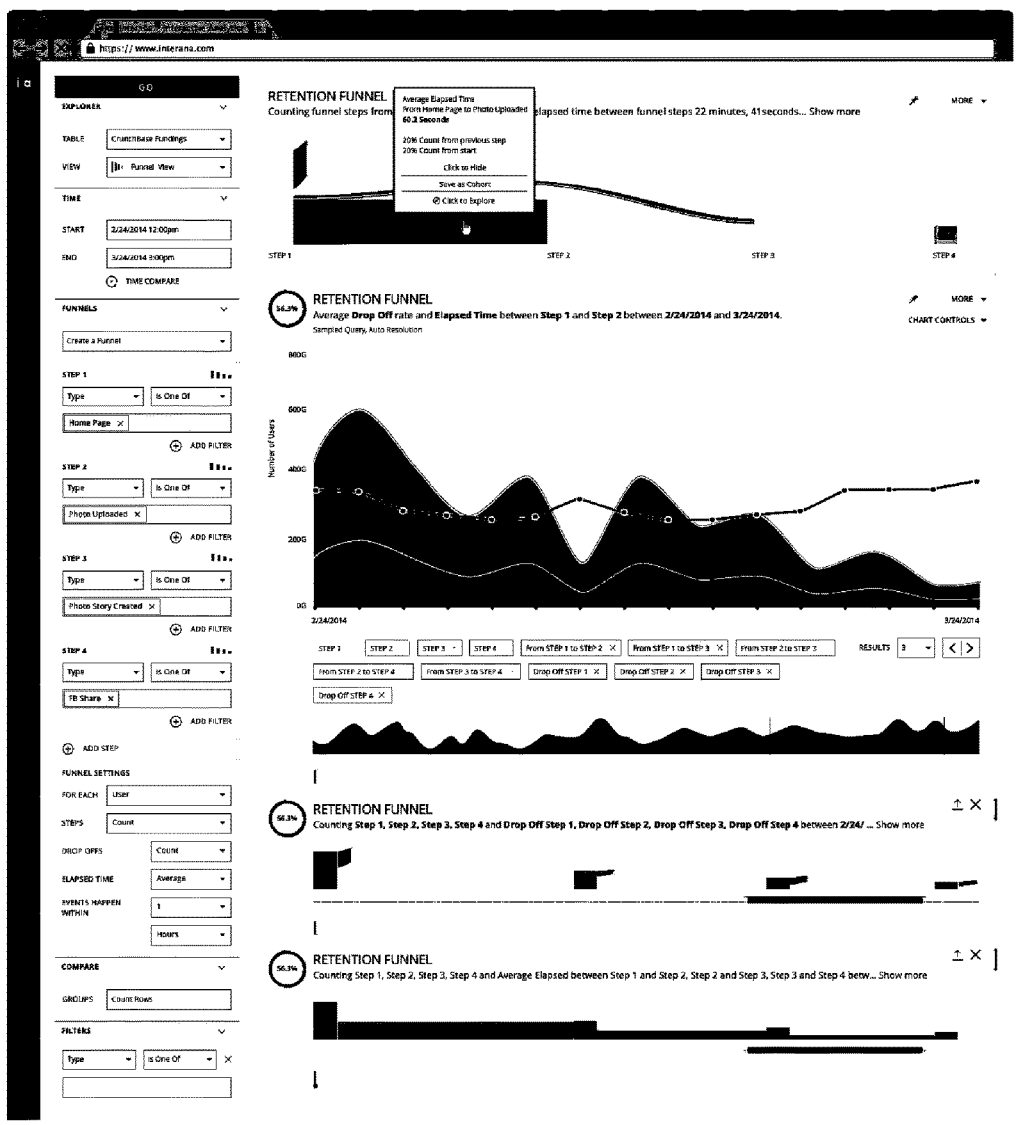
FIG. 3 is an example view of a graphical query generation interface.

S120 preferably includes receiving a query from a user through an API, but may additionally or alternatively include receiving a query from any suitable source (e.g., automated queries from a computer, user queries generated by a graphical data analysis platform). Queries may be generated either manually or automatically by data analysis platforms; for example, queries may be generated as shown in FIG. 3.

Queries may include event data sources, time ranges, filters, partition functions, and metric functions. Event data sources are preferably references to event data fields in an event database; for example, "e.sweater_id" might refer to an event data field corresponding to a type of sweater sold. Time ranges are ranges of time over which a query should be searched; queries preferably ignore event data for which the "e.time" value is outside the specified time ranges. Filters preferably allow data to be included or excluded from a query based on a filtering condition; filters are preferably applied to any event data that satisfies the time ranges, but may additionally or alternatively be applied to any other event data. Any event data that does not satisfy the filters is preferably excluded from query results. In this way, the time range is preferably similar to other filters, except in that the time range preferably has higher priority than other filters. For example, if a set of filters includes a filter that states "e.sweater_id>10", "Filter(e)" would return "False" for any events "e" with "e.sweater_id≤10". Partition functions are preferably evaluated for any event data that satisfies both time ranges and filters, but may additionally or alternatively be applied to any other event data. Partition functions preferably group events together by satisfaction of one or more relations. The partition function preferably returns all events that satisfy the partition function; for example, "partition(e.sweater_id,23)" would return all events containing that satisfy "e.sweater_id=23". Metric functions preferably produce statistical data from partition functions. Metric functions preferably include functions that produce a sum, percentile, proportion and/or percentage of event data that satisfies a given condition. If the results of a partition function are interpreted as a representative sample from a broader population, metrics may be considered as sample-based estimates of the corresponding broader population metrics. In these cases, query results preferably provide confidence bands for the estimates, equivalent to such as may be obtained by statistical bootstrapping.

Queries may additionally or alternatively include ordering and/or grouping functions. Ordering functions preferably allow for ordering of query results. Ordering functions are preferably applied to final results, but may additionally or alternatively be applied to intermediate results (for example, if ordered results are necessary for a calculation in a query step). Grouping functions preferably allow for grouping of query results. Similar to ordering functions, grouping functions are preferably applied to final results, but may additionally or alternatively be applied to intermediate results. Grouping functions may additionally include cohort functions. Cohort functions are a specific case of grouping functions that divide a population of objects into a set of cohorts, with each object appearing in exactly one cohort.

For queries on sharded data, S120 may include interpreting the query to identify data shards relevant to the query.

S130 includes generating a stratum classification. S130 functions to select one or more of the potential stratum classifiers identified in S110 and generate a stratum classification (i.e., including the stratum classifier as well as the strata definitions).

S130 is preferably performed in response to the specific query received in S120; for example, the stratum classifier (and potentially strata definitions) are selected based on the type of query or the data targeted by the query. Alternatively, S130 may be performed independent of the specific query (e.g., a particular stratum classifier and stratum classification may be selected for a dataset for all queries performed on that dataset).

S130 preferably includes generating the stratum classification by selecting a potential stratum classifier for which the estimated stratified sampling variance is lowest, but may additionally or alternatively include selecting a potential stratum classifier in any other manner. S130 may additionally or alternatively utilize any of the techniques described in S110.

Note that S130 may include selecting multiple stratum classifiers (or multiple stratum classifications corresponding to the same classifier; i.e., different strata definitions for the same classifier); in this example, the multiple classifiers may be evaluated simultaneously during query execution.

Figure 4:
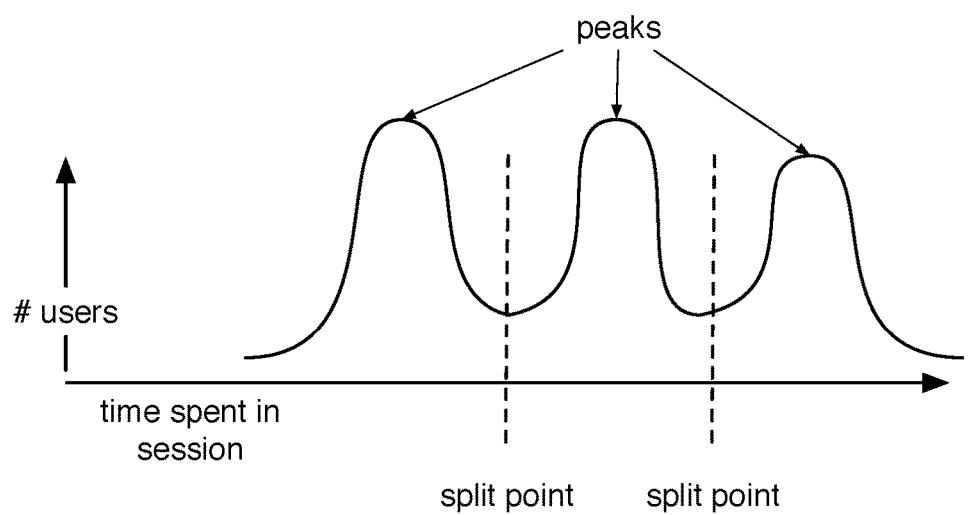
FIG. 4 is an example distribution view of target data.
Figure 5:
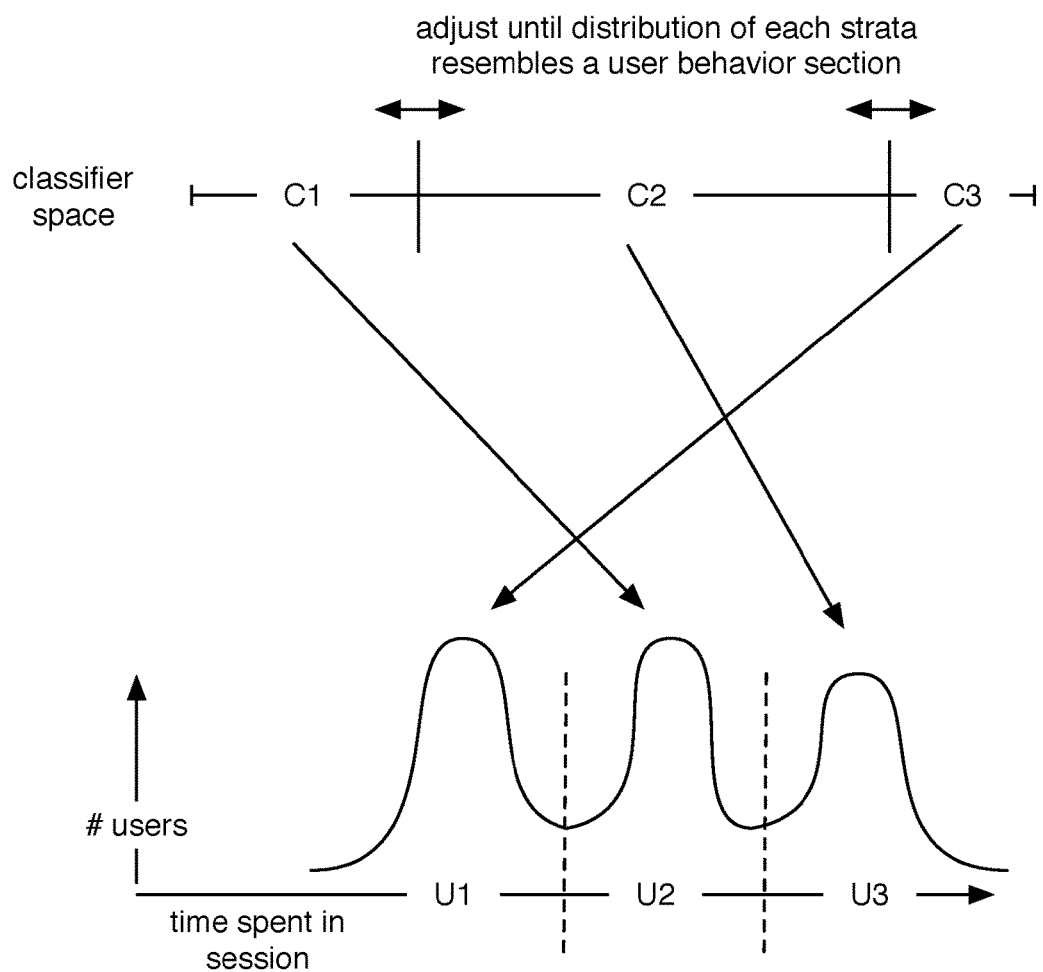
FIG. 5 is an example view of matching target data sections to classifier strata of a method of an invention embodiment.

S130 may include generating the strata definitions in any manner. In a first example, S130 includes analyzing a distribution of user behavior data (e.g., number of users vs. time spent in a website session), as shown in FIG. 4. Then, S130 identifies multimodality of the distribution, and attempts to separate the modes (e.g., by dividing the data at a split point between two peaks). Finally, S130 analyzes each section of the divided distribution relative to the stratum classifier (e.g., user age). For example, if the user behavior data is divided in three, S130 may divide the stratum classifier space in three and adjust the boundaries of the stratum classifier space divisions such that the distribution of user behavior for each stratum closely resembles the distribution of user behavior within a unique section of the user behavior data, as shown in FIG. 5. While this may be done in any manner, an example using sample means is as shown below:

$$\overline{C_1}-\overline{U_1}+\overline{C_2}-\overline{U_2}+\overline{C_3}-\overline{U_3}$$

$$\overline{C_1}-\overline{U_1}+\overline{C_2}-\overline{U_3}+\overline{C_3}-\overline{U_2}$$

$$\overline{C_1}-\overline{U_2}+\overline{C_2}-\overline{U_1}+\overline{C_3}-\overline{U_3}$$

$$\overline{C_1}-\overline{U_2}+\overline{C_2}-\overline{U_3}+\overline{C_3}-\overline{U_1}$$

$$\overline{C_1}-\overline{U_3}+\overline{C_2}-\overline{U_1}+\overline{C_3}-\overline{U_2}$$

$$\overline{C_1}-\overline{U_3}+\overline{C_2}-\overline{U_2}+\overline{C_3}-\overline{U_1}$$

These six equations represent the sum of the differences in means between each possible matching of classifier space strata to user behavior sections. By minimizing each of these by varying classifier space strata boundaries and then selecting the smallest result, the best match (evaluated by mean) between classifier space strata and user behavior data sections may be found. This is but one example, enabled by S130, of first dividing user behavior data into sections based on properties of the user behavior data distribution and then attempting to match those sections to strata in classifier space; S130 may include performing this technique in any manner.

Figure 6:
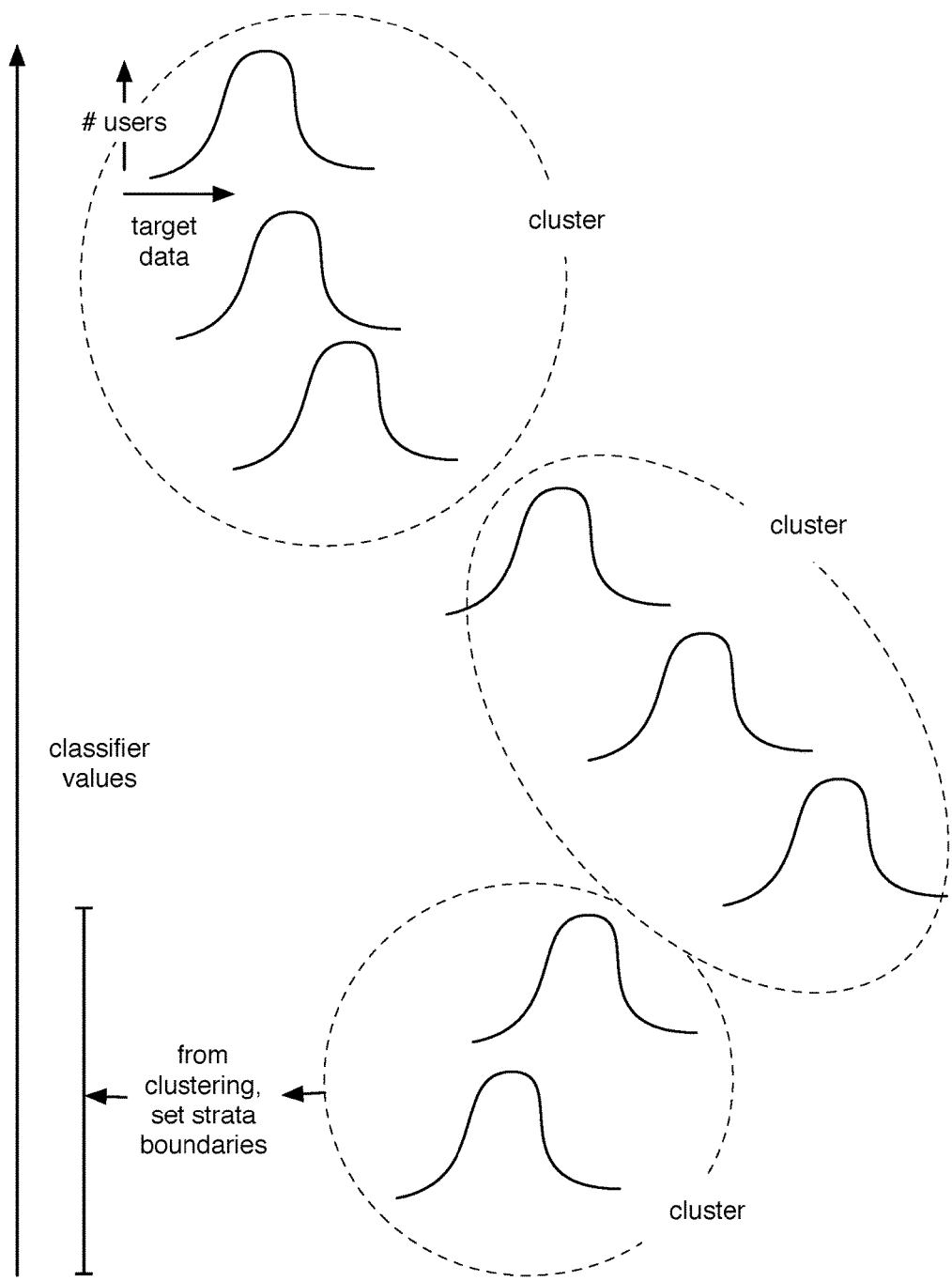
FIG. 6 is an example view of matching target data sections to classifier strata of a method of an invention embodiment.

In a second example, S130 includes analyzing a three-dimensional distribution of target data (e.g., user behavior data) across classifier values, as shown in FIG. 6 (for display purposes, the distribution is shown as two-dimensional slices of target data distributions across classifier values, but it is understood that this could also be visually modeled in three dimensions). In this example, S130 may include identifying clusters in the three-dimensional distribution (i.e., areas of local similarity of target data distribution across classifier values), and setting strata boundaries accordingly. Note that this technique may also be used to identify stratum classifiers (e.g., it may be used in S110). For example, several three-dimensional distributions (of different classifiers) may be compared to determine which distribution results in more clustering (i.e., rather than more uniformly distributed).

In a third example, S130 may include setting strata boundaries by evenly dividing the space of a stratum classifier.

For any technique, S130 may include setting the number of strata in any manner (e.g., based on manual specification, automatically based on constraints, etc.). For example, S130 may include selecting strata by a selection algorithm weighted by the number and/or size of strata (e.g., fewer and larger strata are preferred, but a solution with numerous/small strata may be selected if the resulting stratified variance is substantially lower).

S130 may additionally or alternatively include updating strata definitions (or switching stratum classifiers) at any point during query execution. For example, S130 may include selecting a stratum classifier based on the target data identified by a query and a potential stratum classifier linked to that type of data in S110, and then using a set of strata definitions previously used with that classifier. During execution of the query in S140, S130 may include altering the strata definitions iteratively to lower the variance resulting from stratified sampling.

In one example, S130 may include using a machine learning algorithm to select stratum classifiers and/or set strata boundaries. S130 any other suitable portion of the method 100 that can employ machine learning can utilize one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and any suitable form of machine learning algorithm. Each processing portion of the method 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the method 100.

S140 includes executing the query using a stratified sampling technique. S140 functions to execute the query received in S120 using a stratified sampling technique according to one or more of the stratum classifications generated in S130.

As discussed in the sections describing S130, S140 may include executing the query according to changing stratum classifications and/or evaluating stratum classifications during query execution. For example, S140 may include collecting a random sample from a target dataset in a first stage of query evaluation and determining the distribution of this data with respect to one or more potential stratum classifiers (this distribution, or any other statistical analysis, can be used in generating or updating the stratum classification). S140 may additionally or alternatively include evaluating multiple stratum classifications simultaneously (and/or non-stratified random sampling); for example, S140 may include calculating the sample variance of a sample both for standard random sampling and for stratified sampling using one or more stratum classifications. Note that the evaluation of stratum classification may be performed regardless of the sampling technique used; for example, random sampling may be used until a stratified sampling technique performs better (e.g., results in lower variance), then S140 may include sampling according to the stratified sampling technique. Note that any sampling technique not involving stratified sampling may be referred to as a non-stratified sampling technique.

Note that in some implementations, S140 may not have a direct effect on data sampling. For example, S140 may include randomly sampling a dataset but evaluating the dataset using a stratified sample variance of the dataset (potentially in addition to the random sample variance). This may be useful in scenarios where the number of samples to be taken from any individual stratum is proportional to the size of the stratum (e.g., a stratum is 33% of stratum space and 33% of total samples are to be taken from that stratum) and/or in scenarios where it may be difficult to sort or select data according to a particular classifier (e.g., the data is not grouped, sorted, or indexed by that classifier). Alternatively, S140 may include selecting a stratum classification and sampling according to that classification (this is more likely performed when there is an ability to specifically sample data corresponding to a particular stratum). Note that S140 may include switching or otherwise modifying sampling techniques at any time.

In S140, executing the query according to a stratified sampling technique may include choosing either or both of sampling order and sample number (in addition to query evaluation). For example, S140 may include sampling randomly within a given strata until a particular variance and/or strata sample size is obtained before moving onto another strata (e.g., if data is ordered by strata). As another example, S140 may include randomly sampling from various strata until one or more strata no longer require sampling (e.g., crossing a variance threshold), after which point S140 may continue sampling only on remaining strata. As a third example, S140 may include sampling from strata in turn (e.g., random sample from strata 1, then random sample from strata 2, etc.) until one or more strata no longer require sampling, after which point S140 may continue sampling only on remaining strata.

More generally, S140 may include performing data collection in any manner; for example, S140 may include collecting data until a stratified sampling variance of the data is lower than a threshold variance. As a second example, S140 may include collecting data until a confidence interval (which depends on stratified sampling variance) of a query result is lower than a threshold value.

In one example implementation, S140 includes executing the query using a multiple pass sampling method. On the first pass, small samples from a large number of data shards in a sharded dataset may be scanned simultaneously. In this example, S140 preferably includes performing intermediate calculations on the samples to identify or refine potential query results. This set of potential query results is then used as input for a next pass. The next pass may be another identification/refining pass (similar to the first pass, but with a different input), or the next pass may be a final pass. The final pass preferably includes full scans of data shards containing suspected relevant information to the query, but may additionally or alternatively include only partial scans of data shards. Query results are preferably calculated from the results of the final pass.

For example, a query seeks to identify the top 100 most active users over the past month for a particular website. In the first pass, data shards of an event dataset (containing user id and activity data, and distributed across many nodes of a distributed computing system) are queried; on each node, query execution attempts to identify the top users from small samples of the data. The results of the first pass are then compared, and a list of the top 10,000 users is generated from data sample estimations. A full scan of all data shards containing data on those 10,000 users is then executed, and from this list the top 100 users are determined.

The number of passes is preferably assigned manually and defaults to two passes, but may additionally or alternatively be set automatically. The sampling method (including how much data is sampled in each pass and how samples are chosen in each pass) is preferably determined automatically according to a desired confidence interval and level, as well as the selected sampling technique (e.g., the selected stratum classification).

For example, the samples chosen for a population estimate desired to be within a particular confidence interval at a particular confidence level would preferably be chosen according to the stratified sample variance for the selected stratum classification; the number of samples corresponding to the minimum number required for such a confidence interval and level.

After some threshold has been reached, (e.g., a certain number of passes, an elapsed time threshold, or a confidence value threshold), S140 includes returning query results. S140 preferably includes returning raw data (e.g., event data) and/or metric data, but may additionally or alternatively include returning a confidence interval, confidence level, or other estimation of the accuracy of query results.

In addition to returning events and metrics, S140 may additionally or alternatively include returning objects and/or groups of objects (called cohorts). For example, a query may request the set of "terminal_id" values for events that satisfy the partition function "partition(e.sweater_id,23)". Cohorts may include behavioral cohorts; e.g., a group of users satisfying a particular sequence of events. For example, the group of users that were active on a particular website for more than ten hours over a one-week timespan.

Note that for some queries (e.g., total count queries), stratified sampling may require scaling the query result to produce a representative population estimate. S140 may include scaling or otherwise processing the query results (and/or sample data) in any manner based on the stratum classification.

Further, for queries on sharded datasets, note that stratified sampling techniques may be used in S140 to identify shards for sampling purposes. For example, if a shard key is also a stratum classifier (e.g., data is sharded by UserID and UserID is selected as a stratum classifier), data may be selectively sampled from shards (i.e., shards may be selected for sampling) according to the stratified sampling technique. For example, if each shard contains 10,000 entries and 30,000 samples are desired from a particular stratum classifier range, S140 may include selecting three shards corresponding to shard key values within that stratum classifier range (or six shards and sampling from them, etc.).

The methods of the preferred embodiment and variations thereof can be embodied and/or implemented at least in part as a machine configured to receive a computer-readable medium storing computer-readable instructions. The instructions are preferably executed by computer-executable components preferably integrated with a computer system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A method for stratified-sampling-based query execution comprising:
    receiving and interpreting a query; wherein interpreting the query comprises identifying a first set of data shards containing data relevant to the query;
    collecting a first data sample from the first set of data shards using a non-stratified sampling technique;
    performing statistical analysis on the first data sample; wherein performing statistical analysis comprises calculating a first variance of the first data sample;
    identifying a stratum classifier of the first data sample from the statistical analysis;
    generating a stratum classification by calculating strata boundaries for the stratum classifier; wherein calculating strata boundaries comprises calculating a set of strata boundaries such that a stratified sampling variance of the first data sample using those strata boundaries is less than the first variance;
    collecting a second data sample using a stratified sampling technique; wherein the stratified sampling technique is performed according to the stratum classification; and
    calculating a result to the query based on analysis of the second data sample;
    wherein collecting a second data sample comprises identifying a second set of data shards containing data relevant to the query and collecting the second data sample from the second set of data shards; wherein the second set of data shards contains data not contained in the first set of data shards; wherein the second set of shards are sharded by the stratum classifier; wherein identifying the second set of data shards comprises identifying the second set of data shards according to the stratified sampling technique.

2. The method of claim 1, wherein collecting a second data sample comprises collecting data until a stratified sampling variance of a combination of the first and second data samples is lower than a threshold variance.

3. The method of claim 1, wherein collecting a second data sample comprises collecting data until a confidence interval of the query result is below a threshold value; wherein the confidence interval depends upon a stratified sampling variance of a combination of the first and second data samples.

* * * * *